W. A. DARRAH.
PROCESS OF FORMING JOINTS.
APPLICATION FILED JULY 22, 1911.
1,090,456. Patented Mar. 17, 1914.
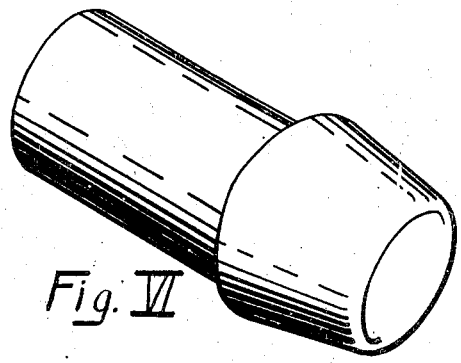
Fig. VI.
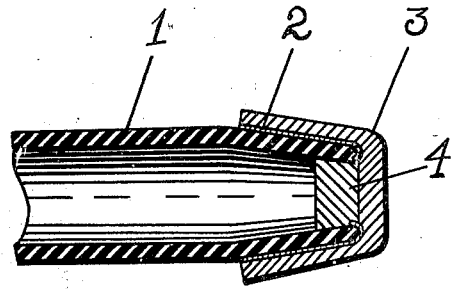
Fig. I.
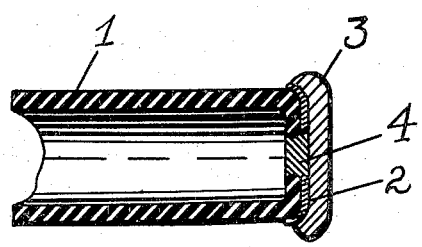
Fig. III.
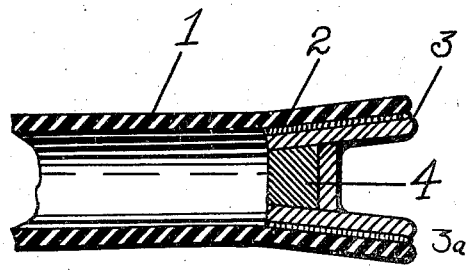
Fig. II.
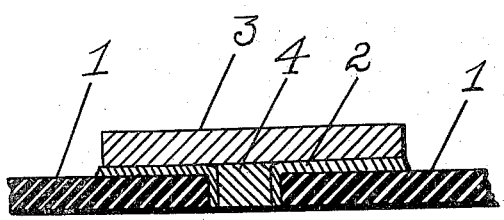
Fig. IV.
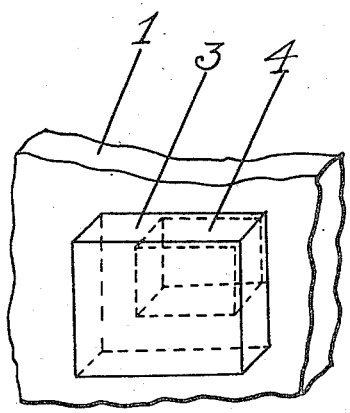
Fig. V.
Ferdinand Lee
Joseph H. Bowing
Witnesses:
William Austin Darrah
Inventor

UNITED STATES PATENT OFFICE.

WILLIAM AUSTIN DARRAH, OF BROOKLYN, NEW YORK.

PROCESS OF FORMING JOINTS.

1,090,456.  Specification of Letters Patent.  Patented Mar. 17, 1914.

Application filed July 22, 1911. Serial No. 640,021.

*To all whom it may concern:*

Be it known that I, WILLIAM AUSTIN DARRAH, a citizen of the United States, and a resident of Brooklyn, in the county of Kings and State of New York, have invented a certain new and useful Process of Forming Joints, of which the following is a specification.

My invention relates to tight joints between glass, silicates, quartz, porcelain, and similar insulators, and a conductor; and this specification describes the methods of constructing such joints, and the details and structure of the joints when made.

The object of my invention is to provide a joint between a conductor and glass, quartz, porcelain, or the various silicates, and other insulators which may be used in the arts as a substitute for and improvement on, the platinum seal which is now employed almost universally in incandescent lamps, vapor lamps, vapor rectifiers and other devices where a tight joint is desired between glass or similar insulators, and a conductor.

While the joint which is formed by sealing a platinum wire or disk or strip into a glass tube is reasonably tight, yet it is comparatively very expensive due principally to the high price of metallic platinum. Such a joint also requires considerable skill in construction where the diameter of the platinum is large or when the parts connected to the platinum have a large capacity for conducting or for radiating heat, or when it is not convenient to maintain the platinum at a white heat. Moreover a platinum seal is not absolutely permanent, even when constructed under the most favorable conditions, as is demonstrated by the gradual deterioration of mercury vapor lamps and rectifiers, which when heated, or when alternately heated and cooled as a result of service conditions exhibit a progressive leakage of air into the exhausted chamber, a considerable portion of this leakage taking place along the seal. This failure of platinum seals is due to a number of causes but results largely from the high temperature necessary for making the joint, and from the difference in the thermal coefficient of expansion of glass and platinum. Thus, because of the high cost of platinum, in the common commercial process, the glass surrounds the platinum, instead of the platinum surrounding the glass, and the result is that as the platinum is sealed into the glass at a high temperature, and as it contracts more rapidly than most kinds of glass on cooling, the glass is placed under tension which is a condition it is poorly adapted to stand. The forces thus created tend to gradually separate the platinum from the glass thus eventually causing the seal to fail. This is especially true of such types of apparatus as mercury lamps and mercury rectifiers, etc., which are normally operated at rather high temperatures, especially if overloaded.

To overcome the defects outlined above, and to avoid the expense of the large quantity of platinum which has been necessary are the objects of my invention. These objects may be accomplished in the following manner:—1. By employing a certain design of joint as set forth. 2. By employing certain materials and combination of materials in the construction of the joint. 3. By employing certain processes in constructing the joint. A description of these means which comprise my invention is given in this specification and then definitely pointed out in the following claims.

Considering first the form of joint it is a well known fact that the elastic limit of glass and the insulators under discussion, is much greater for forces which produce compression than for forces which produce tension. It therefore follows that glass and insulators such as quartz, porcelain, silicates, hard rubber, bakelite, etc., which also possess this property, will stand a much greater force in compression than in tension and the first part of my invention consists in so designing a joint between the materials in question, and a conductor, such that all or the larger part at least of the strains will be in compression. The strains here referred to include those normally resulting from the different thermal coefficients of expansion of the two materials, when subjected to temperature variations.

Referring now to the drawing, Figures 1, 2, 3, and 4 are sectional views indicating some of the various forms in which my invention may be applied, though it is evident that there are many other forms which come under the spirit of this specification. The joints which are shown in Figs. 1, 2, and 3, are specially applicable to tubes or surfaces having relatively small radii of curvature, while the form shown in Fig. 4, may be applied to a surface with a larger radius of curvature or to a flat surface. Fig. 5 is a perspective of the joint shown in Fig. 4 while Fig. 6 is a perspective of the joint disclosed in Fig. 1.

In the drawing the reference number 1 refers to the tube or plate of glass or other insulator as quartz, porcelain, silicates, hard rubber, bakelite, etc., to which the conductor is to be joined.

Reference number 2 indicates the conducting layer which may be formed by any of the methods later to be described in this specification, or by other methods.

3 and 3ª indicate the conductor which is joined to the insulator 1, while 4 indicates a conductor which may be employed in some cases to close the opening in the tube or plate 1, while the conductor 3 is being put into place. Thus 4 may be a solid conductor as lead, solder, or graphite, over which the conducting layer 3 is electrodeposited, or otherwise added, or 4 may be a mercury globule, or other liquid conductor. In either case it may or may not be removed after 3 is added.

I desire it to be clearly understood that the actual types here shown are merely a few illustrations of the many modifications possible, and which come under the scope of this invention. I further desire it to be understood that where an insulator is mentioned, in this specification, that the term is used to include glass, silicates, quartz, porcelain, bakelite, hard rubber and various composition materials and the large class of allied substances, such as hard rubber, bakelite, compositions, etc., having somewhat similar properties. It is in this sense that the term insulator is used in the specification and in the claims.

Now it may be assumed that in ordinary service conditions the range of temperatures which is encountered is included between the limits of —10° C. and +200° C., this being merely an assumption and not having any bearing whatever on the process or the range to which it is applicable, so that if a conductor (Fig. 1) 3, is used, having a thermal coefficient of expansion greater than that of glass, or the insulator in question, (1), and if it be formed around the tube 1, while both the insulator and the conductor are at a temperature greater than +200° C., then at this temperature and all others lower than this, and thus within the working range previously defined, the conductor 3, will exert a compressive force upon the tube or insulator 1, due to the fact that the conductor tends to contract more rapidly than the insulator. If on the other hand, a conductor is employed, the thermal coefficient of expansion of which is not greater than that of the insulator, and if it be brought into very intimate contact with the outside of the tube or insulator while at a temperature lower than —10° C., on raising the temperature to any value within the service range noted, the insulator will still be under compression due to the fact that it will tend to expand more rapidly than the conducting cap. Considering still the case of the cap, which is chosen for purposes of illustration, it will be evident that the problem consists in making an intimate joint between the conducting cap and the insulator at a low temperature if the conductor has a smaller coefficient of expansion than the insulator, while the problem consists in making an intimate joint between the conducting cap and the insulator at a relatively high temperature if the conductor has a larger coefficient of expansion than the insulator.

For obvious reasons it is advisable to use materials which differ but little in thermal coefficient of expansion from the insulator, since if this is done the strains resulting from changes of temperature are kept a minimum. On the other hand it is impracticable to employ conducting materials which have exactly the same coefficient of expansion as the insulator, both because of the expense of the metal and the variations which commercial conditions introduce in the manufacture of the insulator and in the conductor. I have found it advisable therefore to choose such a conductor, that allowing for commercial variations of both materials involved, the thermal coefficient of expansion of the conductor is certain to be consistently greater or less than that of the insulator. Because of the greater ease of securing commercial materials I have found it more satisfactory to use a conductor having a greater thermal coefficient of expansion than that of most glasses or insulators, but I do not desire to limit myself to this choice.

It is well known that iron and certain iron alloys may be obtained, with a coefficient of expansion less, equal or greater, than that of glass and insulators generally, according to the composition of the alloy. Thus iron and steel having a small percentage of nickel, or steel containing a small percentage of copper and manganese, as well as commercially pure iron are materials well adapted for use in the conducting portion of the joint. Thus the so-called nickel steel containing 20% of nickel has a thermal coefficient of expansion of approximately 0.000011 against 0.00000883 for an average glass. Similarly a 30% nickel steel gives a coefficient of expansion of 0.0000077, and 50% nickel steel, a value of .00000992. Also a steel or commercially pure iron containing .39% copper and .39% manganese gives a coefficient of expansion of 0.000010. Further, under some conditions, bismuth may have values of 0.00001316 and antimony 0.000016.

I do not desire to limit my invention to any of the conductors described above, as these and many other metals and alloys may sometimes be used, according to the conditions. In the description which follows iron will be mentioned as an example but the processes are applicable to other metals or alloys by making such modifications as one skilled in the art can readily devise.

Having now described the structure and the materials employed in making a tight joint between a conductor and glass, quartz, silicates, porcelain, hard rubber, bakelite, and the like, I will now disclose the process of constructing such a joint. This process consists of first rendering the surface of the insulator conducting and secondly of depositing a layer of metal upon the conducting surface thus formed. The formation of the conducting layer can be brought about by electrolytic or by thermal methods as will be described. One method of rendering the surface of the glass, quartz, etc., conducting consists in dipping the insulator in question into a solution of platinum in aqua regia, or into a solution of chloroplatinic acid, and then heating the insulator gradually until the liquid is evaporated, thus leaving a deposit of platinum salts upon the surface of the insulator. If now the temperature of the tube be still further raised, the platinum salts will be decomposed, finely divided metallic platinum being deposited in accordance with well known formulæ. This layer is indicated by reference number 2, in the drawings. The temperature should then be still further increased until the surface of the tube or insulator is softened somewhat, thus allowing the finely divided metal to be fused into the insulator, thus forming the layer 2, of the figures.

The process described above should be repeated sufficiently to secure a uniform deposit of the requisite density and continuity for the successful operation of the following steps.

Instead of the method described above, an electric arc formed between platinum electrodes in air, or in case a direct current is employed one platinum and one electrode of another metal or conductor may be used. In this case the direction of the current should be such that the vapor of the arc is supplied from the platinum electrode. The insulator to be treated should then be previously heated to avoid strains resulting from sudden heating and cooling, and then it should be passed through the arc in such a manner that the vapor will be condensed upon its surface. A high tension arc is preferable for this purpose since it makes possible a longer vapor column thus allowing a greater separation between the electrodes.

In addition to platinum I have found that iron may be used for the arc terminals provided the arc and insulator be maintained in a reducing or inert atmosphere. Also the metals palladium, gold, arsenic, antimony, silver, etc., may be used in an inert atmosphere, though none of these appear to be as satisfactory as platinum.

Another method of rendering the insulator conducting, consists in raising the temperature of its surface to the point where electrolytic conduction takes place. This may be done by a suitable electric heater within or around the tube, or the insulator may be inserted in a flame.

There are other methods of rendering the surface of the insulator conducting, such as the deposition of an antimony, a copper, an arsenic, or a silver mirror upon the surface, either from liquid solutions of the salts of these elements or from gaseous compounds or from vapors. Whichever method is employed the insulator should subsequently be heated until the metal is melted into the surface. This should be done in an inert atmosphere. I also desire to include among the processes of rendering the surface of the insulator conducting, the methods which comprise a reduction of the compound of which the insulator is composed and also methods which depend for their effect upon the carbonization or decomposition of the material of the insulator. Thus, as examples of reduction of the surface, the insulator may be subjected to the effects of X-rays, cathode or vacuum tube discharge, to the radiations of radioactive material, to light of short wave lengths, to electrolytic action, etc. An example of the carbonization or decomposition of an insulator is found in the heating of hard rubber, bakelite, etc., to suitable temperatures.

Considering now the process of forming the conducting layer 3, upon the insulator, I have found that electrolytic methods are most satisfactory though thermal and other methods may be employed. By thermal methods I refer to the casting or welding of the conductor 3, to the conducting surface of the insulator or the metallic deposit thereon.

The electrolytic deposition of iron, iron alloys or other metals or conducting materials may take place from most of the well known baths employed by electroplaters, the precaution being taken however to maintain the said baths at the necessary temperatures to secure the results described in this specification. It will also be necessary to maintain the bath, the insulator, the electrodes, etc., under increased pressure in a number of cases in order to prevent excessive evaporation at the elevated temperatures which may be employed. I have found that an aqueous solution of ferrous sulfate containing a large percentage of glycerin is a satisfactory bath for temperatures of about 180° C., although there are of course many others equally effective. In case it is desired to submit the finished joint to temperatures higher than can readily be obtained in a bath containing water or an aqueous solution, even under convenient pressures, other solvents may be used. Thus in the case of iron the melted double chlorid of iron and sodium or a mixture of ferrous and calcium chlorids or a solution of ferrous oxids in borax, and other well known compounds may be employed, according to the temperature at which it is desired to deposit the metal. While I have referred to iron alone in this case, and it is possible to use commercially pure iron, I also desire to include in all of the above, the mixture of iron and nickel and of iron and copper and manganese and carbon as previously described. In the case that antimony is employed as the conducting material, the bath may be one of those well known solutions for plating this metal, as for instance a solution of tartar emetic in water and hydrochloric acid.

It is desirable, though not absolutely necessary that the anode or positive electrode be composed of the material which it is desired to plate upon the conducting surface of the insulator. In case the anode is not of the same composition as the material which it is desired to plate upon the insulator, it should preferably be of some material which is not appreciably dissolved during the process of plating, and under these conditions the electrolyte should be renewed frequently to insure that the composition of the deposit is satisfactory and that the physical characteristics of the deposit are those required.

The potential applied to produce decomposition should be adjusted to a value which will give the most suitable current density for the particular metal or alloy which is being worked. The current density is different for each case depending upon the composition of the electrolyte, the size and position of the electrodes, the surface exposed, etc., and no definite comprehensive rule may be drawn up. It may be stated however that to insure a strong, firmly adhering, gas-free deposit the current density should be kept low. My experiments have indicated that the addition of gelatin, glue, glycerin, sugar and similar agglutinous or colloidal materials makes allowable a much higher current density than would be possible otherwise. By the term a "temperature approximately as high as any to which it will be subsequently subjected," it is intended to include a difference between the temperature of formation of the conducting layer, and the maximum subsequent temperature such that the strains produced by the difference in the coefficients of expansion of the insulator and the conductor will not be sufficient to destroy either or to injure the joint. Thus the term "approximately" is a variable quantity depending upon the materials employed, their coefficients of expansion, their elasticity and elastic limits, as well as the operating temperatures of the joints.

Having now fully described my invention, what I claim and desire to secure by Letters Patent is as follows:—

1. The method of joining a conductor to an insulator, which consists in rendering the surface of the insulator conducting, and forming a conducting layer thereon, by electrodeposition at a temperature of approximately as high as any to which the joint will be subjected under conditions of subsequent treatment or operation.

2. The method of joining a conductor to an insulator by rendering the surface of the insulator conducting and electrolytically depositing thereon the said conductor while both conductor and insulator are at a temperature such that at any temperature to which they will be subjected under subsequent treatment or operation the joint will be in compression.

3. The method of making a seal between a conductor and an insulator which consists in rendering the surface of the insulator conducting and attaching the conductor thereto by electrodeposition, at a temperature approximately as high as any to which the seal, will be subjected under subsequent treatment or operation.

4. The method of joining an insulator to a conductor by rendering the surface of the insulator conducting and depositing the conductor thereon electrolytically, said deposition taking place from a bath, the temperature of which is approximately as high as any to which the joint will be subjected, under subsequent conditions of manufacture or performance.

5. The method of making a seal between a conductor and an insulator which consists in rendering the surface of the insulator conducting, and attaching the conductor thereto by electrodeposition at a temperature such that the joint will be under compression at any temperature to which it will be subjected under subsequent treatment or operation.

Signed at Brooklyn, in the county of Kings and State of New York this 19th day of July A. D. 1911.

WILLIAM AUSTIN DARRAH.

Witnesses:
 FERDINAND LEE,
 JUNIUS P. VAN CLEAVE.